United States Patent [19]

Schulte et al.

[11] Patent Number: 4,680,003
[45] Date of Patent: Jul. 14, 1987

[54] APPARATUS FOR THE PRODUCTION OF MOLDINGS FROM FLOWABLE REACTIVE COMPONENTS

[75] Inventors: Klaus Schulte; Heinrich Ersfeld, both of Leverkusen, Fed. Rep. of Germany

[73] Assignee: Bayer Aktiengesellschaft, Leverkusen, Fed. Rep. of Germany

[21] Appl. No.: 811,254

[22] Filed: Dec. 20, 1985

[30] Foreign Application Priority Data

Jan. 5, 1985 [DE] Fed. Rep. of Germany ....... 3500235

[51] Int. Cl.$^4$ ............... B29C 39/26; B29C 45/30
[52] U.S. Cl. .................... 425/206; 249/160;
 425/4 R; 425/543; 425/557; 425/562; 425/449;
 425/817 R
[58] Field of Search .......... 425/543, 557, 4 R, 801 R,
 425/542, 562, 568, 200, 206, 567, 190, 447, 449,
 467; 249/160; 264/328.6; 222/145, 190, 510,
 549, 137

[56] References Cited

U.S. PATENT DOCUMENTS

| 2,313,004 | 3/1943 | Pritchard | 249/160 |
| 3,728,053 | 4/1973 | Stillhard et al. | 425/4 R |
| 3,819,313 | 6/1974 | Josephsen et al. | 425/567 |
| 3,897,929 | 8/1975 | Hartmann | 425/567 |
| 3,924,989 | 12/1975 | Althausen | 425/130 |
| 4,067,673 | 1/1978 | Hendry | 425/557 |
| 4,141,470 | 2/1979 | Schulte et al. | 222/137 |
| 4,446,088 | 5/1984 | Daines | 425/817 R |
| 4,582,224 | 4/1986 | Proksa et al. | 425/543 |

FOREIGN PATENT DOCUMENTS 3216647 11/1983 Fed. Rep. of Germany .

Primary Examiner—Willard E. Hoag
Attorney, Agent, or Firm—Gene Harsh; Joseph C. Gil; Aron Preis

[57] ABSTRACT

Apparatus for producing moldings from flowable reactive components comprising
(a) a mold assembly having two halves surrounding a mold cavity,
(b) a mixing device for combining said reactive components mounted on said mold assembly, said mixing device having a mixing chamber,
(c) a supply channel in said assembly for supplying said components from said mixing chamber to said mold cavity,
(d) a throttle device located between said mixing chamber and said mold cavity, said throttle device capable of moving into and out of said supply channel in a direction transverse to the orientation of said supply channel, thereby forming a throttle zone in said supply channel,
(e) a relaxation chamber located in said supply channel between said throttle device and said mold cavity, said apparatus further characterized in that the dividing plane which separates the mold assembly into halves extends through said supply channel, said throttle zone and said relaxation chamber.

5 Claims, 9 Drawing Figures

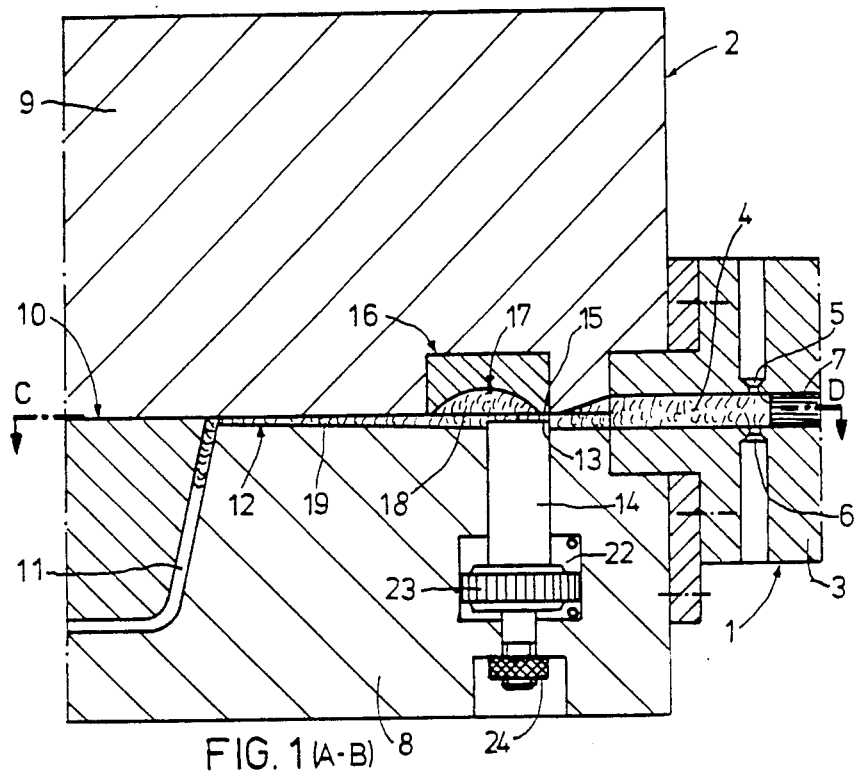
FIG. 1 (A-B)
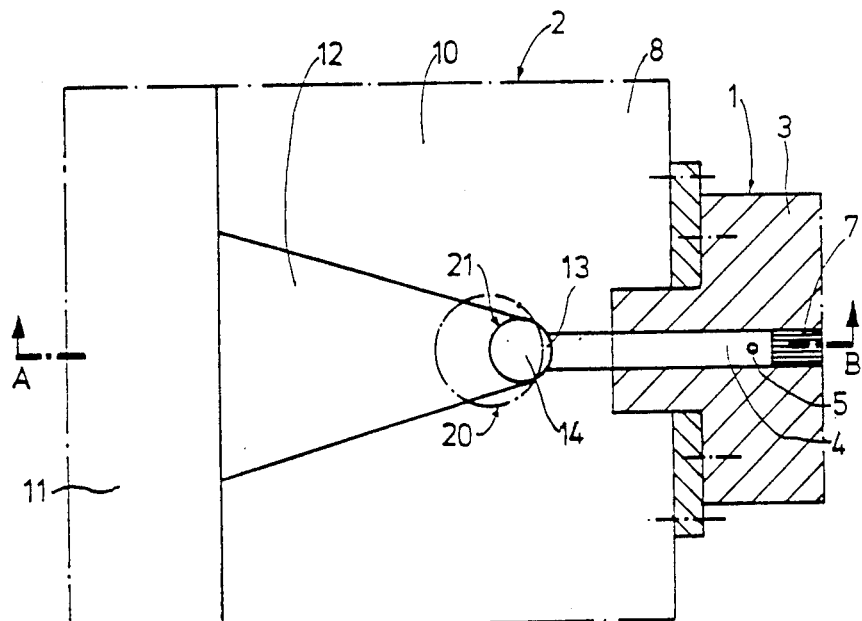
FIG. 2 (C-D)

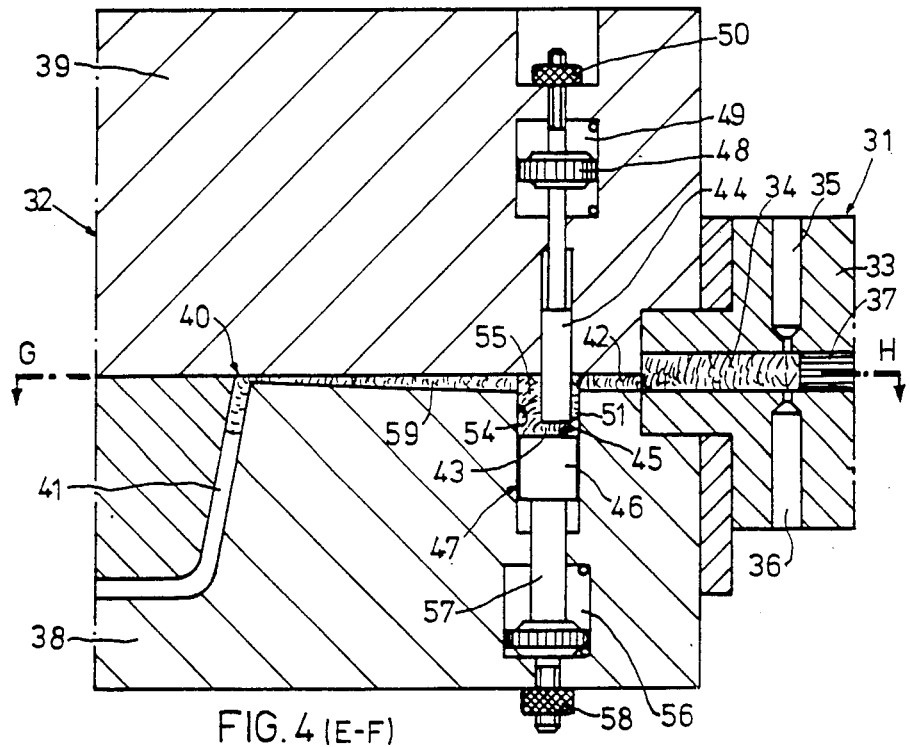
FIG. 4 (E-F)
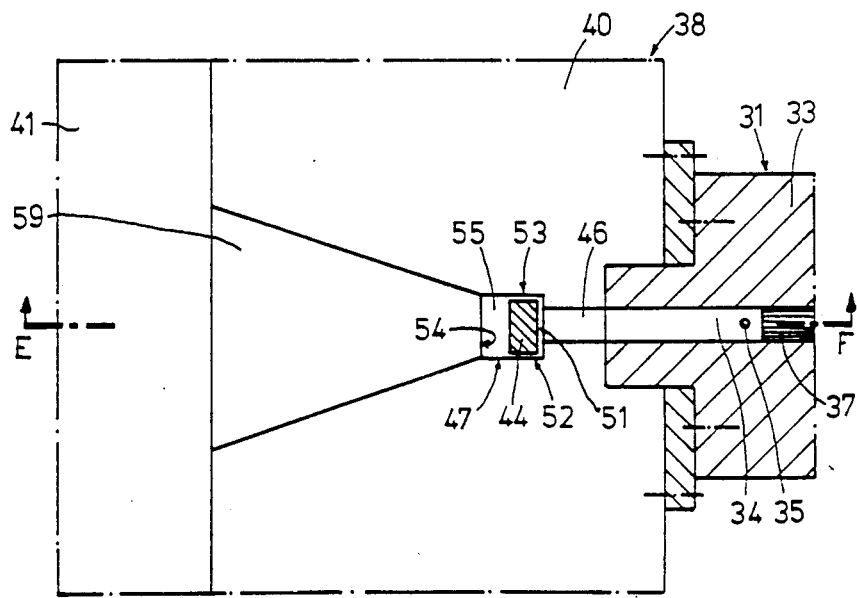
FIG. 5 (G-H)

APPARATUS FOR THE PRODUCTION OF MOLDINGS FROM FLOWABLE REACTIVE COMPONENTS

BACKGROUND OF THE INVENTION

The present invention relates to a combination of a mixing device and mold for the production of moldings from flowable reactive components. The assembly has a supply channel with changes in cross-section extending between the mixing chamber of the mixer and the mold cavity and the mold parting plane runs along the supply channel. Such combinations of mixer and mold are particularly useful for the foaming in situ of polyurethane reaction mixtures to form moldings.

Such combinations can be designed in different ways. The mixer can be integrated into the mold. It can be fixed to the mold or it can be put on the mold only for the filling process.

With such a combination, either the mixer should operate in a self-cleaning manner, or the mixture residue remaining in the mixing chamber can be released with the molding at the same time from the mold. Mixers which have to be rinsed were once used for such purposes, but are no longer used today due to the technical problems and disadvantages connected with cleaning.

In German Offenlegungsschrift No. 26 12 812 (corresponding to U.S. Pat. No. 4,141,470) a throttling device is movable in a bore extending transversally to the guide bore of a discharge piston in a position throttling the cross-section of the guide bore. The throttle device has a through-hole, the cross-section of which corresponds to at least the cross-section of the discharge piston. It is possible, by means of the throttle device, to influence the mixing chamber pressure and the outlet speed of the reaction mixture from the mixing chamber. It is also possible to achieve after-mixing and to bring about a relaxation in the flow in the connecting outlet pipe. This mixer fails, however, when used for the production of highly reactive reaction mixtures which solidify within a few seconds, particularly when large mold cavities must be filled. When the mixing process ends, the throttle device must first be brought out of its operative position into the inoperative position, before the mixing chamber and the connecting outlet pipe can be emptied by means of the discharge piston. Due to the inertia of the control processes and the clearance necessarily contained in the control system, the movement of the discharge piston cannot be introduced until the throttle device has safely assumed its inoperative position. Since the movement of the throttle device and subsequent disengaging of the discharge position takes about one second, the mixture introduced into the mold cavity and present in the outlet tube or in the mixing chamber would already be partially hardened before the start of the cleaning process. Problems thereby naturally arise.

On the other hand, it is known from German Offenlegungsschrift No. 32 16 647 (corresponding to European Pat. No. 0,093,356), to provide in the supply channel, a substantial reduction of the cross-section in relation to the mixing chamber and to provide multiple deviations and changes in cross-section, in order to achieve an after-mixing of the reaction mixture by the changes in the flow relations thus caused. With this mixer the cleaning process can be started more quickly since no moveable throttle device is present at the outlet of the mixing chamber. The changes in cross-section and path deviations provided in the supply channel are however formed such that they simply cause after-mixing. A relaxation section is not present. Due to the substantial deviations, the reaction mixture blasts into the mold cavity at a high speed. The inclusion of air thus cannot be avoided. The separation of the flow and spraying connected therewith can cause surface contours within the molding, which contours damage the homogeneity of the molding and reduce the mechanical strength.

Similar after-mixers are described in U.S. Pat. No. 3,924,989.

An object of the invention is to be able to influence the mixing chamber pressure and the outlet speed of the reaction mixture from the mixing chamber, as to enable an after-mixing, whereby highly reactive systems, such as those which harden within a few seconds, are also processible. At the same time, particular attention should be paid to the relaxation of the flow, so that during the form filling process, a continuous flow front is ensured and the total quantity of mixture required for the production of the molding can be introduced into the mold before the hardening has passed a critical point.

BRIEF DESCRIPTION OF THE DRAWINGS

FIG. 1 shows a longitudinal section along line A-B of FIG. 2 through the mixer and mold according to a first embodiment, during the mold filling process, FIG. 2 shows a top view or a section according to line C-D in FIG. 1, FIG. 4 shows a longitudinal section along line E-F of FIG. 5 through the combination of mixer and mold according to a second embodiment, during the mold filling process, FIG. 5 shows a top view or a section according to line G-H in FIG. 4.

DESCRIPTION OF THE INVENTION

Figure 3:
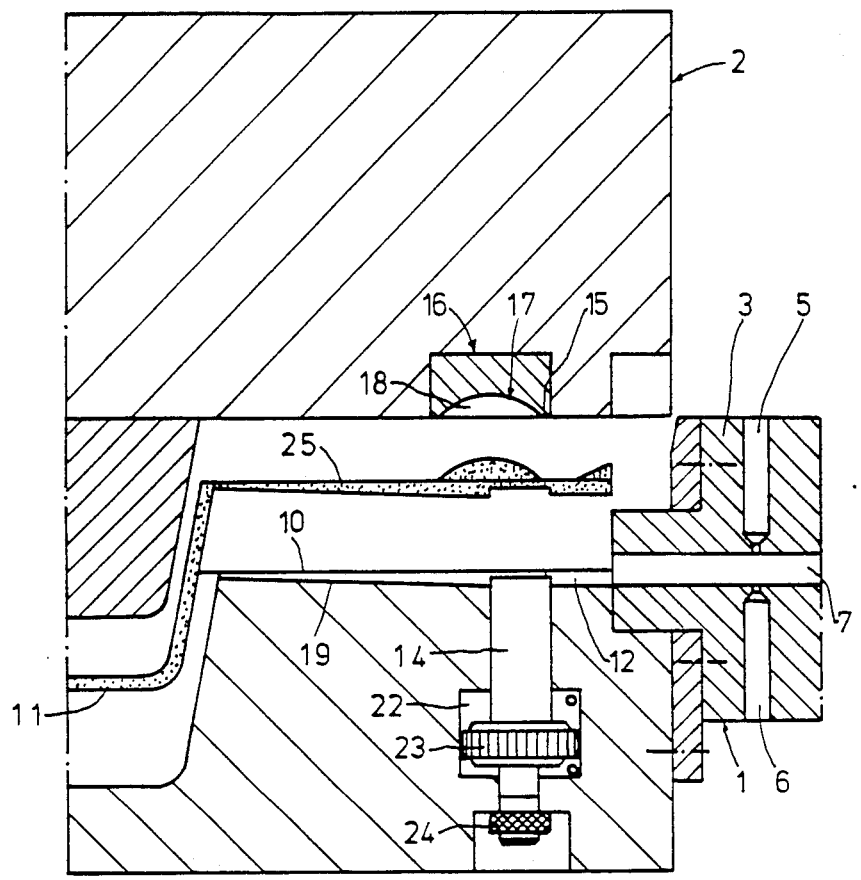
FIG. 3 shows the combination of mixer and mold according to FIG. 1, in the mold release process.

The object is achieved in that a throttle device and a relaxation chamber positioned behind it are provided and in that the mold parting plane also runs through the throttle zone and the relaxation chamber.

In this manner, all advantages of a mixer with a throttle device are obtained. The mechanical and operational expenditure is reduced, and the operational safety is increased. The processibility of reaction mixtures with a hardening time of 1.5 sec and even lower becomes possible. Due to the fact that behind the throttle device, a relaxation chamber is provided which extends over the cross-section of the supply channel and preferably extends at a continuous rate, and that a sufficiently long section of the supply channel is also present, it is guaranteed that even with the necessary high filling speeds the reaction mixture spreads in the mold cavity with a continuous flow front and the danger of the inclusion of air is thus removed. The mold parting plane running through the throttle zone and the relaxation chamber allows the whole supply channel section to be released from the mold. Naturally, this characteristic also includes the contact at a tangent of the throttle device and the relaxation chamber by the mold parting plane. The invention is applicable to all types, of a combination of mixer and mold.

More particularly, the present invention is directed to an apparatus for producing moldings from flowable reactive components comprising (a) a mold assembly having two halves surrounding a mold cavity, (b) a mixing device for combining said reactive components mounted on said mold assembly, said mixing device having a mixing chamber, (c) a supply channel in said assembly for supplying said components from said mixing chamber to said mold cavity, (d) a throttle device located between said mixing chamber and said mold cavity, said throttle device capable of moving into and out of said supply channel in a direction transverse to the orientation of said channel thereby forming a throttle zone in said supply channel, (e) a relaxation chamber located in said supply channel between said throttle device and said mold cavity, said apparatus further characterized in that the dividing plane which separates said mold assembly into halves extends through said supply channel, said throttle zone and said relaxation chamber.

The cross-section of the throttle zone formed by the throttle device is preferably adjustable. This measure enables the mixing to be influenced, (in the case of fluctuations in the consistency of the components) by changing the cross-section of the throttle zone. Undesired fluctuations in the room temperature or the temperature of the components also influence the mixing and can be compensated for by the adjustability of the throttle zone. Moreover, an adjustable throttle zone naturally enables adaptation to reaction mixtures of different types. The throttle zone can be adjusted at the beginning of the mixing process to zero or almost to zero, in order to bring about a particularly intensive preliminary mixing, and can be adjusted to a higher value during the further course of the mixing process.

The adjustability of the throttle zone is preferably caused by the throttle zone being formed by a slider, the hoisting width of which is adjustable, and a counter surface. The slider is designed in the usual manner, for example, as a hydraulic piston and is provided with an adjusting screw for adjusting the hoisting width. If the slider is also to be adjustable during the mold filling process, a particular adjusting device must be provided for this.

According to a particular embodiment, the relaxation chamber has the shape of a spherical dome projecting from the cross-section of the supply channel. This form is particularly favorable for quickly reducing the relatively high flow velocity produced in the throttle zone and for converting this into a laminar flow, which then stabilizes in the connecting section of the supply channel. The peripheral lines of the spherical dome and slider thereby preferably intersect on the side pointing towards the mixing chamber.

Thus a construction of the throttle zone which is particularly short longitudinally and also varies is achieved which causes a particularly fast reduction in velocity of the flow with subsequent mixing particularly in a transverse direction.

According to another embodiment, the throttle zone is formed by a recess with a tappet extending into this recess. A first zone is positioned between the tappet and the wall section, of the recess, pointing towards the mixing chamber. A second throttle zone is positioned between the tappet and the base of the recess. The relaxation chamber is positioned between the tappet and the wall section of the recess pointing toward the mold cavity. The cross-section of the second throttle zone is larger than that of the first zone and the cross-section of the relaxation chamber is larger than that of the second throttle zone. In this manner, the reduction in velocity takes place in several stages, which can be advantageous, for example, for reaction mixtures of higher-viscosity. The tappet and the recess are preferably rectangular in design. The tappet can thus extend in a sealing manner to the side wall section of the recess. A throttle zone can also, however, be formed there. Thus, the tappet preferably consists of a slider, the hoist width of which is adjustable, to which the above-described embodiments can also be applied.

According to one particular embodiment, a slider is passed into the recess, the front of which forms the base of the recess. This slider can also be formed such that the hoist width is preferably adjustable, so that, in combination with a tappet formed as a slider, the length of the first zone and at the same time the volume of the relaxation chamber are adjustable.

According to a further particular embodiment, several throttle zones and relaxation chambers are positioned alternately behind each other. The following throttle zone in each case thereby preferably has a larger cross-section than the preceding one. The following relaxation chamber in each case also preferably has a larger volume than the preceding one. In this manner, an intentional stepwise after-mixing with a reduction in velocity is made possible.

The presence of a slider at the same time makes it possible for the slider to assume the function of an ejector for the sprue rod.

In FIGS. 1 to 3 the apparatus consists of a mounted mixer 1 and a mold assembly 2. The mixer 1 comprises a housing 3 with a mixing chamber 4, into which injection nozzles 5, 6 for the reaction components extend, as well as a discharge piston 7. The mixer 1 is fixed to the lower mold half 8. Between the lower mold half 8 and the upper mold half 9 runs the mold dividing plane 10 and a supply channel 12 extending from the mixing chamber 4 to a mold cavity 11. The supply channel 12 is substantially embedded in the lower mold half 8. The mold dividing plane 10 extends through the supply channel. The supply channel 12 narrows from the mixing chamber 4 towards the throttle zone 13. This zone is formed by an adjustable slider 14 and a counter surface 15. The counter surface 15 is part of an insert 16 fitted into the upper mold half 9, which insert has the contour of a spherical dome 17 towards the supply channel 12. Behind the throttle zone 13 a relaxation chamber 18 is formed which consists of the volume of dome 17 and the volume of the section of the supply channel 12 positioned in this area. To this relaxation chamber is connected an extending and simultaneously narrowing section 19 of the supply channel 12. The periphery line 20 of the dome 17 and the periphery line 21 of the slider 14 intersect on the side pointing towards the mixing chamber 4 and thus form a throttle zone 13 of varying length. The slider 14 is formed as a hydraulic piston 23 which can be introduced on both sides, and which passes into a hydraulic chamber 22, which hydraulic piston is provided with an adjustable screw 24 for adjusting the hoist width and thus the height of the throttle zone 13. After hardening of the molding and opening of the mold 2, the molding can be removed together with the sprue rod 25.

Figure 6:
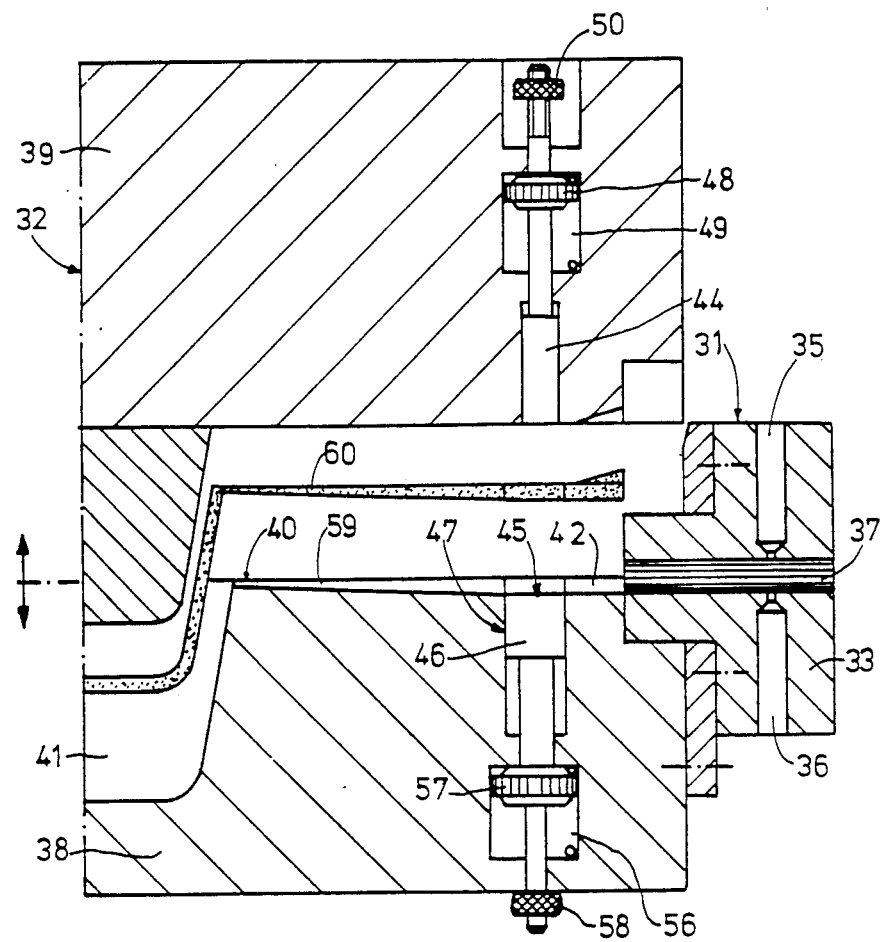
FIG. 6 shows the combination of mixer and mold according to FIG. 4 during the mold release process.

In FIG. 4 to 6, the combination consists of a mounted mixer 31 and a mold 32. The mixer 31 comprises a housing 33 with a mixing chamber 34, in which injection nozzles 35, 36 for the reaction components extend, as well as a discharge piston 37. The mixer 31 is fixed at a lower mold half 38. Between the lower mold half 38 and the upper mold half 39 runs the mold dividing plane 40. A supply channel 42 extending from the mixing chamber 34 to a mold cavity 41 is substantially embedded in the lower mold half 38. The mold dividing plane 40 extends through the supply channel 42. The supply channel 42 narrows from the mixing chamber 34 towards a throttle zone 43. This zone is formed by a tappet which is adjustable and formed as a slider 44, and a counter surface 45, which consists of the front of a second slider 46. The slider 46 forms the base 45 of a recess 47, in which the slider 44 projects. The slider 44 has a rectangular cross-section. It is provided with a hydraulic piston 48, which leads into a hydraulic chamber 49. The hoist width can be adjusted by means of an adjusting screw 50. The slider 44 forms between itself and the wall section 52, of the recess 47, pointing towards the mixing chamber 34, a zone 51 with a small cross-section positioned in front of the actual throttle zone 43. The zone 51 is unadjustable. Its length is, however, variable depending on the adjustment of the sliders 44 and 46. The slider 44 is fitted to the side wall sections 53 of the recess 57 in a sealing manner. A relaxation chamber 55 extends between the slider 44 and the wall section 54 pointing towards the mold cavity 41. The volume of the relaxation chamber can be adjusted by adjusting the slider 46. The slider 46 is likewise provided for this purpose with a discharge piston 57 leading into a hydraulic chamber 56 and an adjusting screw 58. To the relaxation chamber 55 is connected the extending and simultaneously narrowing section 59 of the supply channel 42. One of the sliders 44 and 46 can additionally be formed as an ejector, for which a corresponding control device should be provided. Thus the mold release of the sprue rod 60 is facilitated after the opening of the mold 32.

Figure 7:
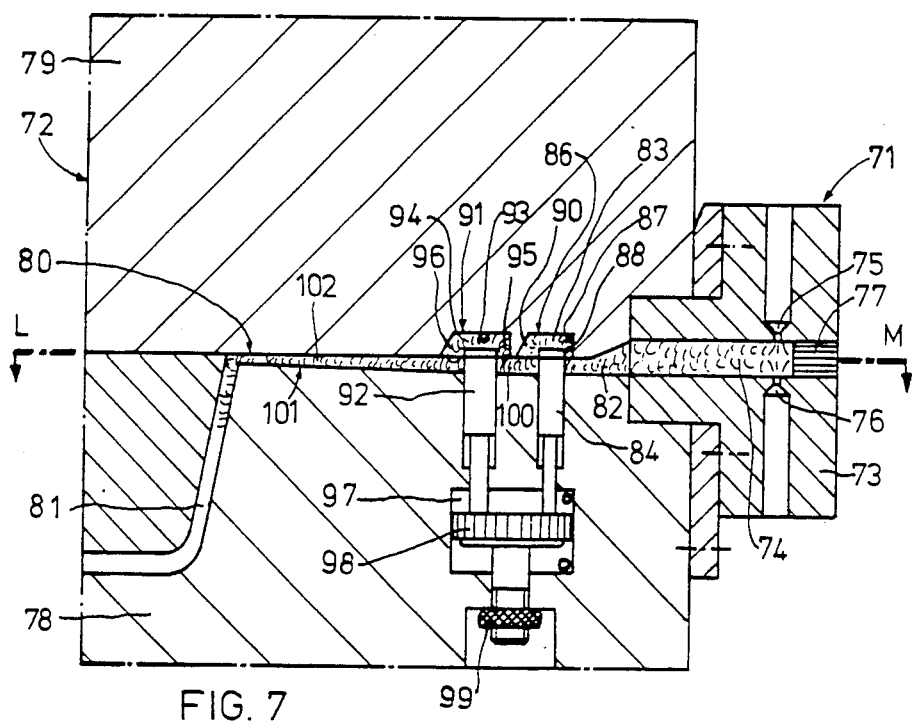
FIG. 7 shows a longitudinal section along line I-K of FIG. 8 through the combination of mixer and mold according to a third embodiment, during the form filling process.
Figure 8:
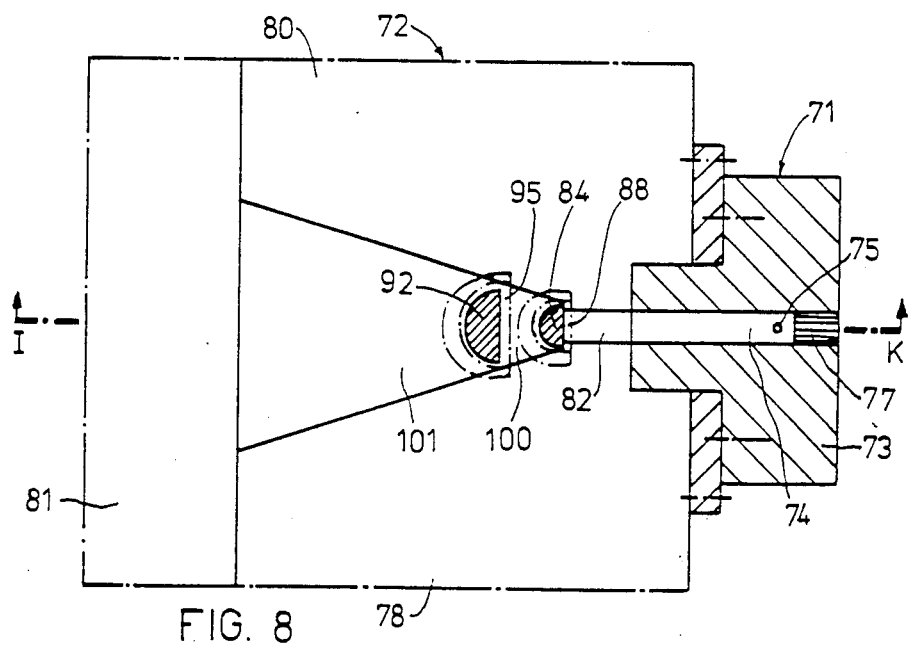
FIG. 8 shows a top view or a section according to line L-M in FIG. 7
Figure 9:
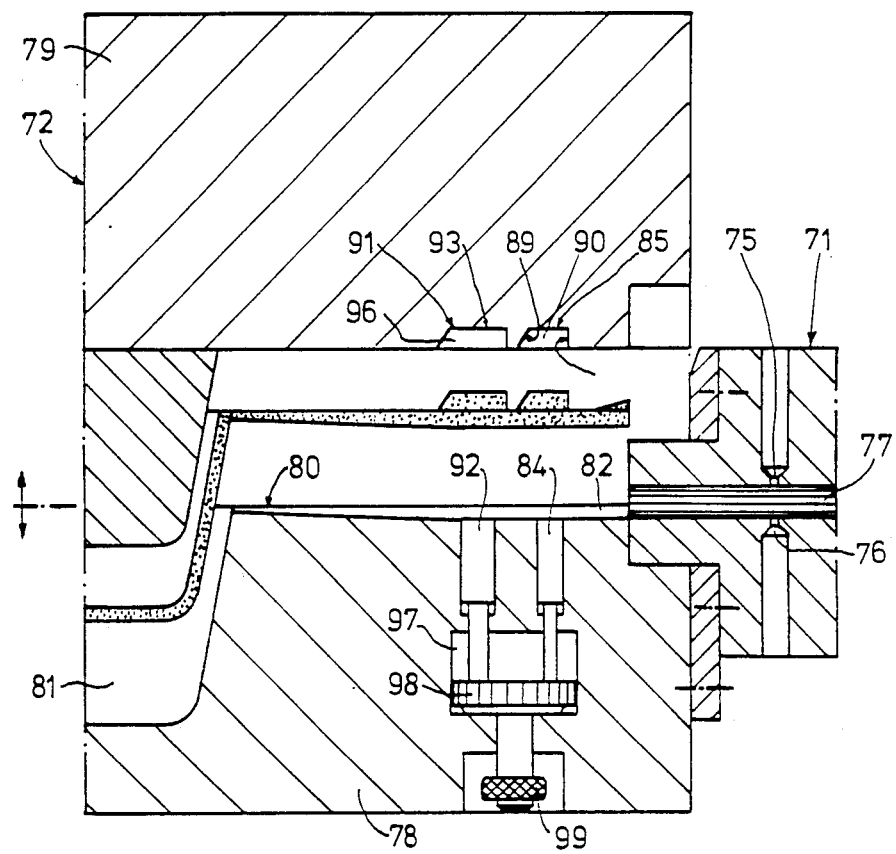
FIG. 9 shows the combination of mixer and mold according to FIG. 7 during the mold release process.

In FIG. 7 to 9, the combination consists of a mixer 71 and a mold 72, the mixer 71 being mounted on the mold 72. The mixer 71 comprises a housing 73 with a mixing chamber 74, into which injection nozzles 75, 76 for the reaction components extend, as well as a discharge piston 77. The mixer 71 is fixed to the lower mold half 78. The mold dividing plane 80 runs between the lower mold half 78 to the upper mold half 79. A supply channel 82 extending from the mixing chamber 74 to a cavity 81 is substantially embedded in the lower mold half 78 and is touched by the mold dividing plane 80. The supply channel 82 narrows from the mixing chamber 74 towards a throttle zone 83. This zone is formed by a tappet formed as a slider 84 with semi-circular cross-section and a counter surface 85, which constitutes the base of a recess 86. The recess 86 is positioned in the upper mold half 79. The slider 84 forms with the wall section 87, of the recess 86, pointing towards the mixing chamber 74, a fixed throttle zone 88 positioned in front of the first throttle zone 83. A relaxation chamber 90 extends between the reverse side of the slider 84 and the wall section 89, of the recess 86, positioned towards the mold cavity 81. This flows via the supply channel 82 into a second recess 91, in which a tappet formed as a slider 92 can likewise be introduced, which tappet forms a second adjustable throttle zone 94 with a counter surface 93 forming the base of the recess 91. The throttle zone 94 is positioned in front of throttle zone 95. A second relaxation chamber 96 is positioned behind the slider 92. The throttle zone 94 has a larger cross-section than the throttle zone 83 and the second relaxation chamber 96 has a larger volume than the relaxation chamber 90. The slider 92 is likewise provided with a larger cross-section than the slider 84. The supply channel 82 already extends from the area of the slider 84 behind the relaxation chamber 96 to the mold cavity 81. The sliders 84 and 92 are positioned on a common, hydraulic piston 98 which leads into a hydraulic chamber 97, which hydraulic piston is provided with an adjusting screw 99. The hoisting width of the sliders 84 and 92 is thus in this embodiment only mutually adjustable. The sliders 84 and 92 can however, vary in length so that the throttle zones 83 and 94 have different heights. Naturally, the sliders 84 and 92 can also have separate hydraulic drive mechanisms and are thus individually adjustable. A section 100 of the supply channel 82 extends between the relaxation chamber 90 and the slider 92 and the section 101 extends between the relaxation chamber 96 and the mold cavity 81. The sprue rod remaining in the supply channel 82 is marked 102.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. An apparatus for producing moldings from flowable reactive components comprising
   (a) a mold assembly having two halves surrounding a mold cavity,
   (b) a mixing device for combining said reactive components mounted on said mold assembly, said mixing device having a mixing chamber,
   (c) a supply channel in said assembly for supplying said components from said mixing chamber to said mold cavity,
   (d) a throttle device located between said mixing chamber and said mold cavity, said throttle device capable of moving into and out of said supply channel in a direction transverse to the orientation of said supply channel, thereby forming a throttle zone in said supply channel,
   (e) a relaxation chamber located in said supply channel between said throttle device and said mold cavity, said apparatus further characterized in that the dividing plane which separates the mold assembly into halves extends through said supply channel, said throttle zone and said relaxation chamber.

2. The apparatus of claim 1, wherein the cross-section of the throttle zone is adjustable.

3. The apparatus of claim 2, wherein the throttle zone is formed by a slider, the hoisting width of which is adjustable, and a counter surface.

4. The apparatus of claim 1, wherein the relaxation chamber has the shape of a spherical dome extending beyond the cross-section of the supply .

5. The apparatus of claim 4, wherein the periphery lines of the dome and the slider intersect each other on the side pointing towards the mixing chamber.

* * * * *